United States Patent

[11] 3,610,977

| [72] | Inventors | Bror Dalmo;<br>John Franked; Hans Landhult; Ove Tjernstrom, all of Vasteras, Sweden |
|---|---|---|
| [21] | Appl. No. | 863,855 |
| [22] | Filed | Oct. 6, 1969 |
| [45] | Patented | Oct. 5, 1971 |
| [73] | Assignee | Allmanna Svenska Elektriska Aktiebolaget<br>Vasteras, Sweden |
| [32] | Priority | Oct. 7, 1968 |
| [33] | | Sweden |
| [31] | | 13485/68 |

[54] SYNCHRONOUS MACHINE HAVING SALIENT ROTOR POLES
7 Claims, 5 Drawing Figs.

[52] U.S. Cl. ................................................. 310/65,
310/162, 310/192, 310/218, 310/269
[51] Int. Cl. .................................................... H02k 1/32
[50] Field of Search ............................................ 310/162,
54, 64, 58, 65, 192, 194, 213, 218, 214, 187, 217

[56] References Cited
UNITED STATES PATENTS

| 1,563,110 | 11/1925 | Regelein ..................... | 310/214 |
| 3,157,806 | 11/1964 | Wiedemann ................. | 310/64 |
| 3,214,617 | 10/1965 | Tudge ......................... | 310/213 |
| 3,381,154 | 4/1968 | Madsen ....................... | 310/213 |
| 3,500,093 | 3/1970 | Wharton ...................... | 310/214 |

FOREIGN PATENTS

| 219,880 | 7/1909 | Germany ..................... | 310/214 |

*Primary Examiner*—D. X. Sliney
*Assistant Examiner*—R. Skudy
*Attorney*—Jennings Bailey, Jr.

ABSTRACT: A synchronous machine includes a rotor ring with salient rotor poles each having a shoe portion and a core portion, with a plurality of gaps between the poles. Liquid cooled field windings are arranged in the gaps surrounding each of the poles. The shoe portions of the rotor poles overlap the gaps by at most 20 percent of the width of the gaps. Within the gaps are T-shaped support members which are keyed into the rotor and which have legs extending between the windings and crosspieces on the outside of the windings.

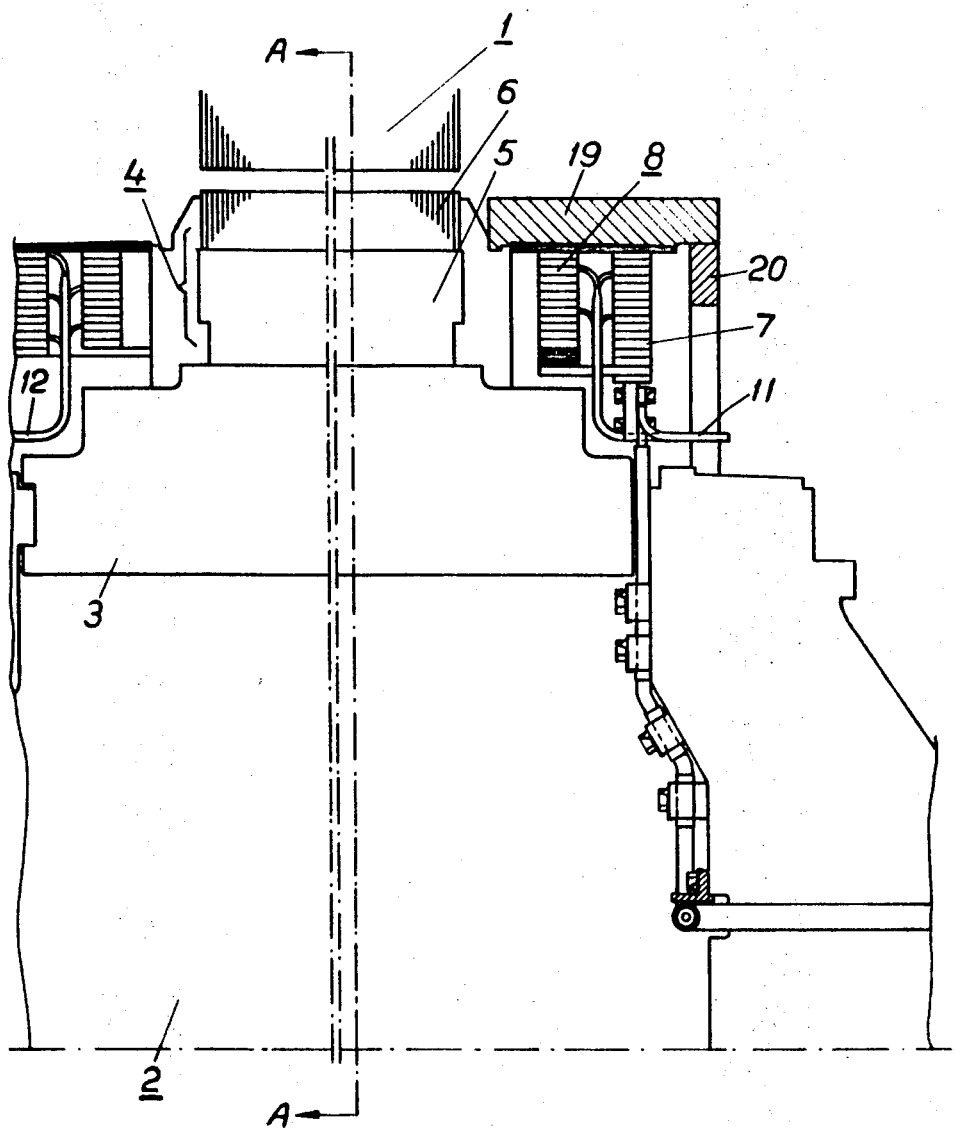

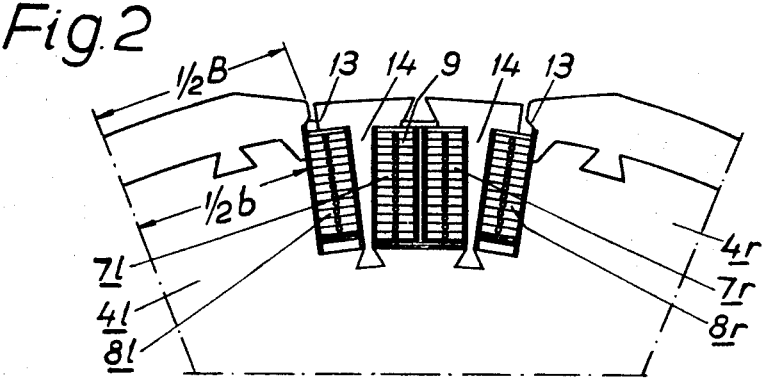
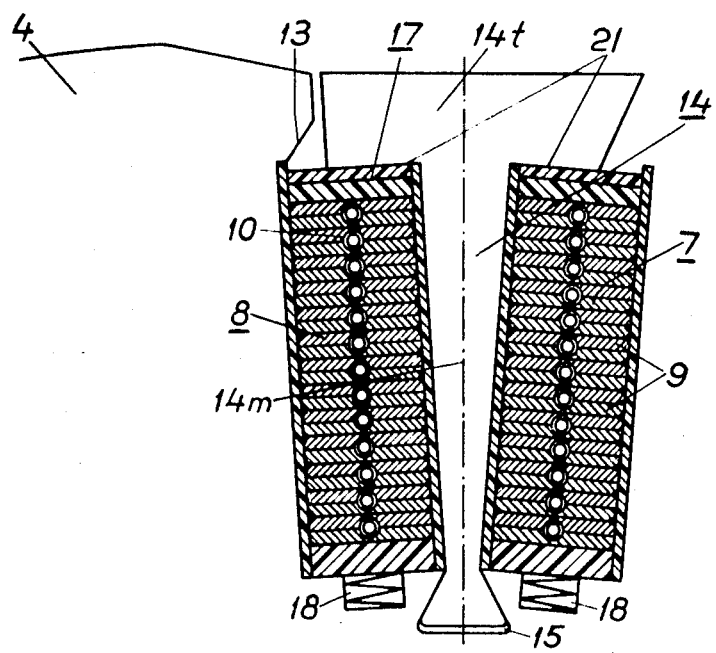
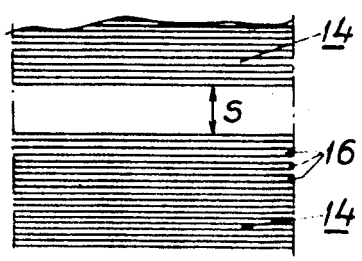
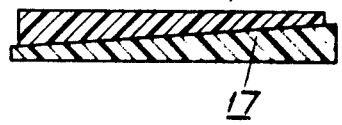
INVENTOR.
BROR DALMO   JOHN FRANKED
HANS LANDHULT  OVE TJERNSTRÖM
BY
Jennings Bailey Jr

SYNCHRONOUS MACHINE HAVING SALIENT ROTOR POLES

BACKGROUND OF THE INVENTION

1. Field of the Invention

The present invention relates to a synchronous machine having salient rotor poles supported by a rotor ring, each of which is surrounded by a number of field coils having direct liquid-cooling.

2. The Prior Art

In such machines air channels in the pole gaps can be avoided which, in many cases, enables advantageous deviations from conventional rotor constructions.

From U.S. Pat. No. 3,157,806 it is known to close the pole gaps of a rotor with directly cooled field windings with the help of screens arranged in the airgap which are located radially outside the poles and, together with flat covers at the rotor ends, form a tight casing so that a reduction of the air friction losses is achieved.

In Elektrotechnische Zeitschrift-A, Volume 87, page 466 a rotor is shown with directly cooled field windings which are held in tangential direction by means of a support member arranged centrally in the pole gap. The support member itself does not have greater radial extension than the field windings but it is provided with a radial extension which supports screens to close the pole gap in axial and radial directions.

In the machines mentioned above the constructive improvements possible have only been partly exploited which, particularly with machines having relatively low pole number, are offered when there is no longer a requirement for a flow of air through the pole gap.

SUMMARY OF THE DISCLOSURE

The purpose of a construction according to the invention is, with a water-cooled machine, to exploit the pole-gap space which is required for the flow of cooling air in conventional machines, in such a way that the magnetic properties of the pole system are improved.

A synchronous machine according to the invention is characterized in that each pole has such a small difference between the maximum tangential dimensions of the pole shoe and the pole core that the total tangential width of the radially inwardly facing surfaces of the pole horns in a gap between adjacent poles is at the most 75 percent of the total tangential width of the field winding sides located in the gap, and that the coils are held against centrifugal forces at their radially outwardly facing surfaces by means of a number of substantially T-shaped support members of material having slight electric and magnetic conductivity, each of which has a central piece which runs radially and is attached in the rotor ring and contacts the sides of the coil, and also a part which runs tangentially and is rigidly connected to the central part, the tangential part having contact surfaces to exert pressure on said radially outwardly facing coil surfaces.

In certain cases said support member is subjected to such great centrifugal forces that the dimensioning required from the strength point of view means that a considerable part of the part of the pole gap cross section lying radially outside said coil sides and between the pole tips is filled by the tangential part of the support member, or by several such parts if several tangentially successive support members are used, that is if the pole gap contains more than one pair of coil sides. However, particularly when a large part of the centrifugal forces operating on a coil side is taken up by the corresponding pole shoe, it may be that a support member dimensioned with consideration only of the centrifugal forces arising does not close said part of the pole gap cross section between the pole tips sufficiently to reduce the air friction losses noticeably. According to a further development of the idea of the invention the part of the pole gap cross section lying radially outside the contact surfaces and between the pole tips is filled at least to the extent of 75 percent by said tangential part of the support member. It is then possible to achieve a considerable reduction of the air turbulence without special screens arranged on the coil support and practically without extra costs.

BRIEF DESCRIPTION OF THE DRAWINGS

In the following the invention will be described with reference to the accompanying drawings when FIG. 1 shows a synchronous machine according to the invention in partial axial section and FIG. 2 a partial cross section through the rotor of the same machine along the line A—A in FIG. 1. FIG. 3 shows a detail in FIG. 2. FIG. 4 shows two support members according to the invention in radial view and FIG. 5 a wedge device to clamp the field winding.

DESCRIPTION OF THE PREFERRED EMBODIMENT

In the drawings 1 designates the stator of a synchronous generator and 2 and rotor, 3 the rotor ring which supports a plurality of salient poles 4, each with its own pole core 5 and pole shoe 6.

Each pole 4 is provided with an outer field coil 7 and an inner field coil 8 surrounded by the outer field coil. The additional designations 1 and r in FIG. 2 are used to denote that the designations refer to the left or right pole, respectively in FIG. 2. The division of the field winding into two coils per pole allows a relatively small width of the conductor and enables the conductors 9 to be wound edgewise. These conductors are provided with inner cooling tubes 10 which are connected to inlet tubes 11 and outlet tubes 12 for coolant. The maximum dimension B of the pole shoe portion is slightly greater than the corresponding dimension $b$ of the pole core portion. The total tangential extension of the radially inwardly facing surfaces 13 of the two pole horns in a pole gap is at the most 20 percent of the total width of the coil sides in the pole gap, whereas 75 percent is considered to be the lowest value which can be permitted if the field winings—as in conventional constructions—are to be held by the pole shoes in such a way that these take up practically all of the centrifugal forces operating on the coils. Although the pole system shown in the drawings has a pole-shoe width B which is somewhat greater than the pole-core width $b$, and thus offers a certain theoretical possibility for the pole horn to take up part of the centrifugal forces, this possibility has intentionally been rejected since a well-defined and unalterable size ratio between the centrifugal forces taken up by the pole horns and support members can hardly be achieved. In the pole system shown in the drawings the pole gap has two tangentially successive rows of a plurality of axially successive T-shaped support members 14, each of which has a tangential part 14 $t$ and a central part 14 $m$, the end of which is attached in a dovetail slot 15 in the rotor ring. Since it is advantageous to hold the coil sides with strong prestressing, a number of wedge devices 17 are arranged axially one after the other between the coil side and the radially inwardly facing contact surfaces 21 of the support members 14. The wedge device is forced in an axial direction and it is suitable to use two wedge devices for each support member— one on each side. In certain cases it may be advantageous to arrange a number of springs 18 in depressions in the rotor ring in such a way that they exert pressure on the surfaces of the coil sides facing radially inwards.

The coil parts running axially outside the poles are held by a retaining ring 19 with support ring 20.

The fact that the support member 14 takes up the centrifugal forces operating on the field winding to a far greater extent than coil supports in conventional machines has the result that the support members 14 arranged in a row between two coil sides together correspond to a considerably greater part of the pole length than is normally the case in a conventional machine. The support members shown in FIGS. 3 and 4 are arranged at a distance $s$ from each other. It may often be advisable to select $s=0$ for reasons of strength. Sometimes—to reduce air fiction losses—it may be advantageous to choose $s$ so small that the coil supports take up at least 90 percent of the coil length although from a strength point of view a lower percentage would be sufficient.

Considering this together with what has been stated above regarding the radial extension of the support members, it will be seen that a construction according to the invention can be adopted without extra costs so that in addition to the considerable improvement of the magnetic conductivity of the pole system, the pole gaps are almost entirely closed.

The support bodies 14 can be cast from a material having low electric and magnetic conductivity. A considerably better solution is achieved, however, if each support member consists of a plurality of T-shaped laminates 16 insulated from each other which are punched out of sheet-metal having the above-mentioned properties and glued to from a stack as shown in FIG. 4. The lamination then provides such an effective reduction of the eddy currents that the loss effect developed in the support elements will be extremely low—in spite of the fact that these take up a relatively large space near the airgap. Furthermore, such a laminated structure exploits the increased strength which is normally achieved when a material is cold-worked—in this case sheet-rolled. The laminated structure also makes it possible, without time-consuming and complicated control methods, to ensure that the coil supports do not have concealed faults in the material.

We claim:

1. Synchronous machine having a rotor ring with salient rotor poles, each having a shoe portion (6) and a core portion (5) with gaps between the poles and a directly liquid-cooled field winding (7,8) comprising several field coils, each coil surrounding one pole only, the difference between the maximum tangential dimension (B) of the pole shoe portions and that (b) of the pole core portions being at the most 75 percent of the total tangential extension of the field coil sides located in such a gap, and a plurality of T-shaped support members (14) in each gap holding the coils against centrifugal forces at their radially outwardly facing surfaces, said support members being of material having slight electrical and magnetic conductivity, each of which support members has a central part (14m) which extends radially and is attached in the rotor ring and contacts the sides of the coil, and a part (14t) which runs tangentially and is rigidly connected to the central part, the tangential part having contact surfaces (21) to exert pressure on the radially outwardly facing surfaces of said coils and thereby transmitting the corresponding pressure forces to the rotor ring through said central part.

2. Synchronous machine according to claim 1, the part of the pole gap cross section lying radially outside said contact surfaces (21) and between the pole tips is filled to an extent of at least 75 percent by said tangential part (14t) of the support member.

3. Synchronous machine according to claim 1, support members arranged in axial sequence are situated immediately next to each other along the entire pole length.

4. Synchronous machine according to claim 1, in which each support member comprises a plurality of punched T-shaped sheet-metal laminates, insulated from each other and glued together, of a material having a slight electric and magnetic conductivity.

5. Synchronous machine according to claim 1, in which each rotor pole is surrounded by two field windings (7,8) the coil sides of the two windings located in the same pole gap being arranged on each side of the central part of a support member (14).

6. Synchronous machine according to claim 1, comprising a plurality of wedge members (17) driven in an axial direction between a radially outwardly facing surface of a coil side and contact surfaces (21) of the corresponding support member.

7. Synchronous machine according to claim 1, in which a plurality of springs (18) are arranged to exert spring force on the radially inwardly facing sides of the coil sides.